United States Patent [19]

Moen

[11] 4,241,754
[45] Dec. 30, 1980

[54] PUSHBUTTON DIVERTER

[75] Inventor: Alfred M. Moen, Grafton, Ohio

[73] Assignee: Stanadyne, Inc., Windsor, Conn.

[21] Appl. No.: 946,811

[22] Filed: Sep. 28, 1978

[51] Int. Cl.³ .................. F16K 31/44; F16K 51/00
[52] U.S. Cl. .................................. 137/119; 137/467; 251/85
[58] Field of Search .............. 251/84, 85, 87, 324; 137/119, 467

[56] References Cited

U.S. PATENT DOCUMENTS

| | | | |
|---|---|---|---|
| 2,173,743 | 9/1939 | Humason | 251/85 |
| 2,659,566 | 11/1953 | Rand | 251/324 |
| 2,659,567 | 11/1953 | Rand | 251/324 |
| 2,830,619 | 4/1958 | Hollander | 251/324 |
| 3,700,206 | 10/1972 | Jones | 251/84 |
| 3,826,274 | 7/1974 | Moen | 137/467 |
| 3,961,768 | 6/1976 | Veugelers | 251/324 |

Primary Examiner—Martin P. Schwadron
Assistant Examiner—H. Jay Spiegel
Attorney, Agent, or Firm—Kinzer, Plyer, Dorn & McEachran

[57] ABSTRACT

A shower-tub diverter valve has a housing with a diverter chamber and a water inlet and shower and tub outlets in communication with the chamber. A diverter formed of a stem and a loosely attached cylindrical member are reciprocal in the chamber between a position providing communication between the inlet and the tub outlet, and a second position in which the diverter cylindrical member blocks said communication. The diverter cylindrical member is in substantial sealing relation with the tub outlet when in the blocking position. The cylindrical portion of the diverter is movable relative to the stem and the diverter chamber includes guide means for use in aligning the diverter cylindrical portion as it moves between the described positions.

7 Claims, 3 Drawing Figures

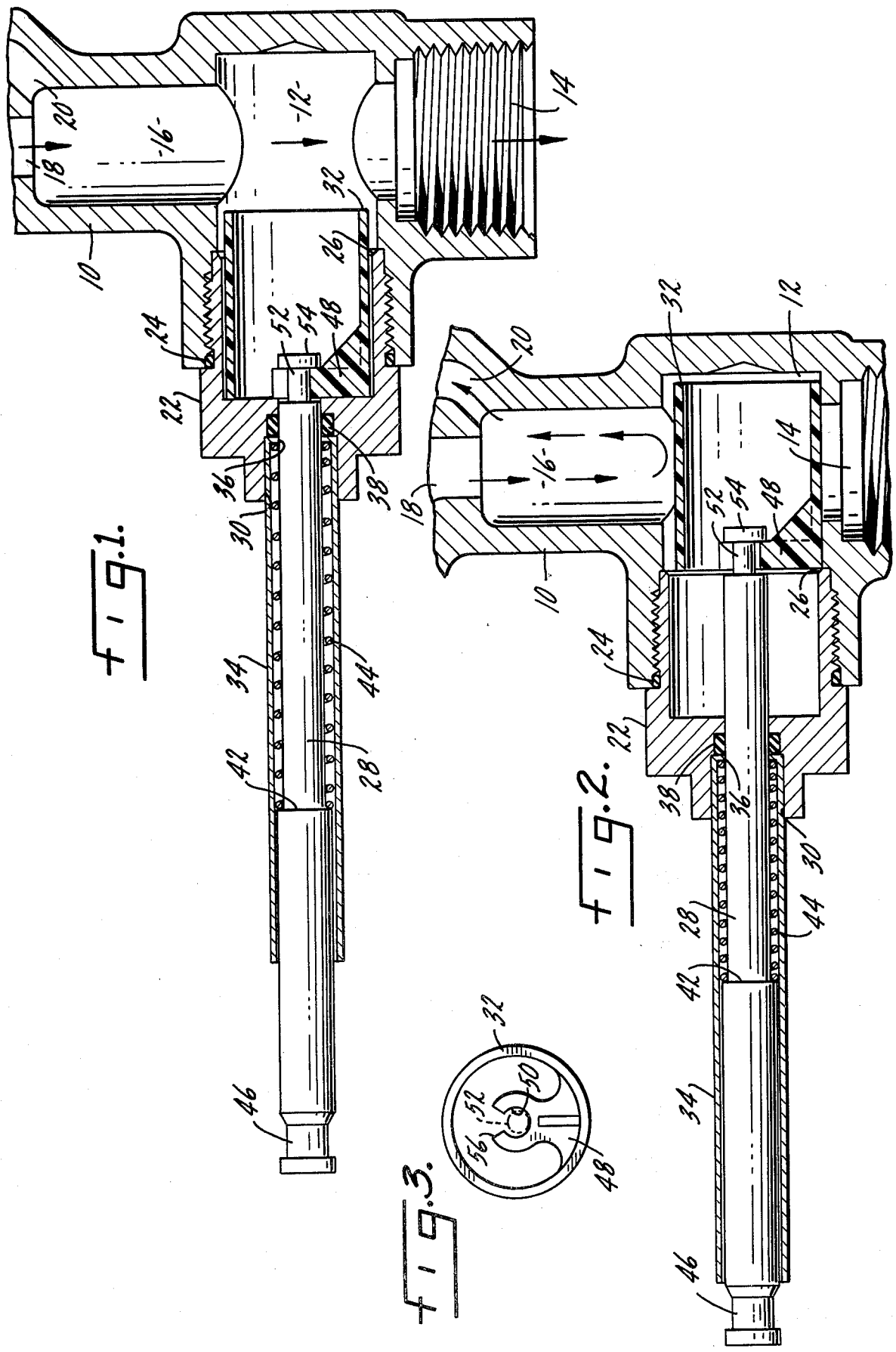

PUSHBUTTON DIVERTER

SUMMARY OF THE INVENTION

The present invention relates to improvements in shower-tub diverter valves.

A primary purpose of the invention is a diverter valve which forms a substantial seal at the tub outlet.

Another purpose is a diverter valve of the type described in which a portion of the diverter cooperates with a portion of the diverter chamber to inhibit return movement of the diverter to the normally open position.

Another purpose is a diverter valve including a diverter having a stem and a loosely attached cylindrical member, which cylindrical member forms a substantial seal at the tub outlet when in the blocking position.

Another purpose is a simply constructed, reliably operable shower-tub diverter valve of the type described.

Another purpose is a diverter valve which forms a substantial seal with the tub outlet, permitting a small amount of leakage, to facilitate return of the diverter valve to the open position.

Other purposes will appear in the ensuing specification, drawings and claims.

BRIEF DESCRIPTION OF THE DRAWINGS

The invention is illustrated diagrammatically in the following drawings, wherein:

FIG. 1 is an axial section through a diverter valve of the type described;

FIG. 2 is an axial section, similar to FIG. 1, showing the diverter valve in an operated position, blocking water access to the tub outlet; and FIG. 3 is an end view of a portion of the diverter member.

DESCRIPTION OF THE PREFERRED EMBODIMENTS

My prior U.S. Pat. No. 3,826,274 disclosed a shower-tub diverter valve permitting leak-down of water trapped in the diverter chamber or trapped above the diverter chamber in the shower conduit. The present invention performs the same function and is specifically designed to provide simplicity in manufacture and more reliable operation over the valve shown in the above patent.

A shower-tub diverter valve is commonly used to change the direction of water flow in a combination bathtub and shower from a discharge toward the tub to a discharge toward the shower head. Normal position of the diverter permits water to be discharged through a tub outlet. When the diverter is moved to what is known as an operated position, it shuts off flow to the tub, causing water to flow upward to the shower head. When the water is turned off, the diverter will automatically return to the unoperated position, as described in detail hereinafter.

A housing is indicated generally at 10 and has a diverter chamber 12. A tub outlet 14 communicates with chamber 12 and a passage 16 communicates with the top of diverter chamber 12. A water inlet 18 and a shower passage 20 are in communication with passage 16 and thus with diverter chamber 12. Normally water will flow from inlet 18 to passage 16, through diverter chamber 12, and then out tub outlet 14. When the diverter is in the operated position of FIG. 2, water will flow from inlet 18 into passage 16 and then upwardly through shower passage 20.

Diverter chamber 12 is closed at one end by a nut or the like 22 which may be in threaded engagement with housing 10 and there may be a seal 24 to provide a water tight connection between these two members. The inner end of nut 22 may have a beveled edge 26 as will be described hereinafter.

The diverter member includes a stem 28 extending outwardly through an opening 30 in nut 22. A generally cylindrical member 32 is loosely mounted on the end of stem 28. An elongated sleeve 34 substantially encloses stem 28 and has an in-turned annular edge 36 at its inner end which is used to position a seal 38 in contact with nut 22. Seal 38 prevents water from passing outwardly along the surface of the stem. Stem 28 has an enlarged portion forming a shoulder 42 which seats one end of a coil spring 44, the other end of the spring being contained by in-turned shoulder 36. A knob or knob-receiving portion 46 is formed at the outward end of stem 28 and forms a means whereby the user may operate the diverter valve.

Cylindrical member 32 may be formed of a suitable plastic or other material which provides some flexibility or some measure of distortion. The member 32 may be open at its opposite ends or it may be solid. In the form shown herein it is open and there is an upstanding bracket 48, particularly shown in FIG. 3, which provides a means for attaching the cylindrical member to the stem. Bracket 48 has an opening 50 slightly larger than the cross section of stem portion 52 whereby the cylindrical member is loosely attached to the stem. Note the enlarged head 54, FIGS. 1 and 2, which provide a means for securing the cylindrical member to the stem. Opening 50 has an upwardly opening notch 56. Thus the cylindrical member is snapped onto the reduced diameter stem portion 52 and thereby is fixed to the stem, but in a loose attachment.

The unoperated position of the diverter valve is illustrated in FIG. 1. Note that the outer cylindrical surface of member 32 is closely adjacent to the interior surface of nut 22. The diverter is held in the FIG. 1 position by spring 44. When the diverter is to be operated, to change water flow to the shower, it is pushed inwardly until it reaches the position of FIG. 2. The outer cylindrical surface of member 32 seals against tub outlet opening 14. This may not be a complete seal, but is a substantial seal. There is a provision for some leak-down around the seal. To some extent the plastic or other material used in forming member 32 will distort inwardly into tub outlet 14, although this distortion will be slight, depending upon the type of material.

When the diverter is moved from the position of FIG. 1 to the position of FIG. 2, cylindrical member 32 will move radially downwardly after it has passed beveled edge 26. This is permitted by the loose eccentric connection between member 32 and stem 28. In the position of FIG. 2 water will pass from inlet 18 into passage 16 and then directly up shower passage 20. Some water will leak around cylindrical member 32 as the seal is not complete. This is not a disadvantage but is advantageous. When water is shut off, and assuming the diverter is in the position of FIG. 2, the diverter will automatically return to the position of FIG. 1. There is, however, a pressure head of water in passage 16 which must first be reduced. This water will leak down past the imperfect seal of member 32 upon tub outlet 14.

Once the pressure of water has been released upon member 32, it is thus free to return to the position of FIG. 1 under the influence of spring 44. To facilitate such return, the beveled edge 26 on nut 22 forms a guide to raise the diverter so that it may pass within nut 22. That portion of diverter chamber 12 adjacent the tub outlet 14 is slightly larger than the interior of nut 22, providing a somewhat looser fit for member 32. The beveled guide edge 26 will move the diverter to a position where it may enter that portion of the chamber within nut 22 as the diverter is urged to the position of FIG. 1 under the influence of spring 44.

Guide edge 26 performs one additional function in that it assists pressure in passage 16 in holding member 32 against outlet 14. When the diverter is in the position of FIG. 2 edge 26 prevents longitudinal return movement of the diverter as long as water pressure acts downwardly upon member 32.

Although diverter member 32 has been described as a hollow cylinder, it could be solid, or it could be otherwise. What is important is that it provide a substantial or somewhat imperfect seal against tub outlet 14.

Whereas a preferred form and several variations of the invention have been shown and described, it should be understood that suitable additional modifications, changes, substitutions and alterations may be made without departing from the invention's fundamental theme.

The embodiments of the invention in which an exclusive property or privilege is claimed are defined as follows:

1. A shower-tub diverter valve including a housing having a diverter chamber, a water inlet and shower and tub outlets in communication with said chamber, a diverter reciprocal in said chamber between a position providing communication between said inlet and tub outlet and a position in which said diverter blocks said communication, said diverter having a stem and a loosely attached cylindrical member formed of a somewhat distortable material, said cylindrical member being in substantial sealing relation with said tub outlet when in said blocking position, said cylindrical member being movable relative to said stem when moving between said positions, guide means in said chamber to assist said cylindrical member in moving between said positions, and to assist in holding said cylindrical member in said blocking position, said diverter chamber having a first portion in alignment with said inlet and tub outlet and being somewhat larger than said cylindrical member, and a second portion, smaller than said first portion and more closely sized relative to said cylindrical member, said guide means being between said first and second diverter chamber portions so that when said cylindrical member is in said position blocking said communication, said cylindrical member is moved relative to said stem by water pressure at said water inlet to thereby coact with said guide means to substantially prevent reciprocal movement of said cylindrical member.

2. The structure of claim 1 further characterized in that said guide means includes a beveled edge.

3. The structure of claim 2 further characterized in that said beveled edge extends circumferentially about said chamber.

4. The structure of claim 1 further characterized in that said diverter cylindrical member is substantially hollow.

5. The structure of claim 1 further characterized by and including spring means associated with said stem and urging said diverter toward said first-named position.

6. The structure of claim 1 further characterized in that the loose attachment of said cylindrical member to said stem includes an opening in said cylindrical member and a cooperating stem portion, smaller in cross section than said opening.

7. The structure of claim 1 further characterized in that said diverter member moves radially toward said tub outlet when moving from said first-named position to said blocking position.

* * * * *